US012656647B2

(12) United States Patent
Liao et al.

(10) Patent No.: US 12,656,647 B2
(45) Date of Patent: Jun. 16, 2026

(54) ARRAY SUBSTRATE AND REFLECTIVE DISPLAY PANEL

(71) Applicants: Hefei BOE Optoelectronics Technology Co., Ltd., Hefei (CN); BOE Technology Group Co., Ltd., Beijing (CN)

(72) Inventors: Liqing Liao, Beijing (CN); Hongmin Li, Beijing (CN); Silin Feng, Beijing (CN); Ying Wang, Beijing (CN); Fengjing Tang, Beijing (CN)

(73) Assignees: Hefei BOE Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 95 days.

(21) Appl. No.: 18/667,966

(22) Filed: May 17, 2024

(65) Prior Publication Data

US 2024/0302701 A1 Sep. 12, 2024

Related U.S. Application Data

(63) Continuation of application No. 18/308,107, filed on Apr. 27, 2023, now Pat. No. 12,019,343, which is a
(Continued)

(30) Foreign Application Priority Data

Jan. 29, 2021 (CN) .......................... 202110127358.0

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC .......................... G02F 1/136286; G02F 1/1368
See application file for complete search history.

(56) References Cited

U.S. PATENT DOCUMENTS 11,686,984 B2 6/2023 Liao et al.
2007/0296879 A1 12/2007 Lin
(Continued)

FOREIGN PATENT DOCUMENTS

CN 1932591 A 3/2007
CN 102667596 A 9/2012
(Continued)

OTHER PUBLICATIONS

CN 202110127358.0 first office action issued on Nov. 25, 2024.
(Continued)

*Primary Examiner* — James A Dudek
(74) *Attorney, Agent, or Firm* — IPro, PLLC

(57) ABSTRACT

An array substrate and a reflective display substrate are disclosed. The array substrate includes a base, and a plurality of data lines and a plurality of sub-pixels that are disposed on the base. The sub-pixel includes a reflective pixel electrode and a TFT. An orthographic projection of the pixel electrode in each sub-pixel on the base is overlapped with orthographic projections of a first electrode, a first data line and a second data line.

17 Claims, 6 Drawing Sheets

Related U.S. Application Data continuation of application No. 17/585,863, filed on Jan. 27, 2022, now Pat. No. 11,686,984.

(56) References Cited

U.S. PATENT DOCUMENTS

| 2009/0225017 A1 | 9/2009 | Kim et al. |
| 2010/0141860 A1 | 6/2010 | Kim et al. |
| 2012/0299898 A1 | 11/2012 | Yamashita et al. |
| 2016/0147119 A1 | 5/2016 | Chang et al. |
| 2021/0173271 A1* | 6/2021 | Long .................... H10D 86/481 |
| 2022/0308413 A1 | 9/2022 | Liao et al. |
| 2022/0382110 A1 | 12/2022 | Wang et al. |

FOREIGN PATENT DOCUMENTS

| CN | 204009303 U | 12/2014 |
| CN | 106483710 A | 3/2017 |
| CN | 107272292 A | 10/2017 |
| CN | 109524422 A | 3/2019 |
| CN | 215769283 U | 2/2022 |
| JP | 2002156654 A | 5/2002 |
| WO | 2021244133 A1 | 12/2021 |
| WO | 2021249182 A1 | 12/2021 |

OTHER PUBLICATIONS

Non-final office Action of U.S. Appl. No. 17/585,863 issued on Aug. 17, 2022.

Final office Action of U.S. Appl. No. 17/585,863 issued on Dec. 16, 2022.

Notice of allowance of U.S. Appl. No. 17/585,863 issued on Feb. 17, 2023.

Non-final office Action of U.S. Appl. No. 18/308,107 issued on Nov. 9, 2023.

Notice of allowance of U.S. Appl. No. 18/308,107 issued on Feb. 22, 2024.

* cited by examiner

A-A'

000

A-A'

ARRAY SUBSTRATE AND REFLECTIVE DISPLAY PANEL

CROSS-REFERENCE TO RELATED APPLICATION

This application is a continuation application based on U.S. application Ser. No. 18/308,107, filed on Apr. 27, 2023, and claims priority to Chinese Patent Application No. 202110127358.0, filed on Jan. 29, 2021 and entitled "ARRAY SUBSTRATE AND REFLECTIVE DISPLAY PANEL", the disclosure of which is incorporated herein by reference in its entirety.

TECHNICAL FIELD

The present disclosure relates to the field of display technologies, and in particular, relates to an array substrate and a reflective display panel.

BACKGROUND

With the development of display technologies, various display panels are coming into the market. A reflective display panel is capable of displaying an image without a backlight source. The reflective display panel generally includes an array substrate and a color film substrate that are oppositely disposed, and a liquid crystal layer disposed between the array substrate and the color film substrate. The array substrate includes a base and a plurality of pixel electrodes disposed on the base. The pixel electrode is made of a light-reflective metal material. In this way, the plurality of pixel electrodes are capable of reflecting ambient light, such that the reflective display panel displays the image without the backlight source.

SUMMARY

Embodiments of the present disclosure provide an array substrate and a reflective display panel.

According to one aspect of the embodiments of the present disclosure, an array substrate is provided.

The array substrate includes a base, and a plurality of data lines and a plurality of sub-pixels that are disposed on the base; wherein the sub-pixel includes a reflective pixel electrode and a thin film transistor, wherein a first electrode of the thin film transistor is connected to a first data line, and a second electrode of the thin film transistor is connected to the pixel electrode; in the sub-pixel, a first overlap region is defined between an orthographic projection of the pixel electrode on the base and orthographic projections of the first electrode and the first data line on the base, and a second overlap region is defined between the orthographic projection of the pixel electrode and an orthographic projection of a second data line on the base; and the first data line is one of the plurality of data lines, and the second data line is one of the plurality of data lines and is adjacent to the first data line.

In some embodiments, a portion that is in the sub-pixel and disposed in the first overlap region is configured to form a first parasitic capacitor, and a portion that is in the sub-pixel and disposed in the second overlap region is configured to form a second parasitic capacitor; wherein a capacitance of the first parasitic capacitor is equal to a capacitance of the second parasitic capacitor.

In some embodiments, the first electrode and the second electrode of the thin film transistor are disposed in a same layer and made of a same material as the plurality of data lines; and an area of the first overlap region on the base is equal to an area of the second overlap region on the base.

In some embodiments, the plurality of sub-pixels are arranged in a plurality of columns along a first direction and are disposed in a plurality of rows along a second direction, and the data lines generally extend on the base along the second direction; and the plurality of sub-pixels include a first sub-pixel and a second sub-pixel that are in a same row of sub-pixels and disposed on both sides of the data line, and the data line comprises a first portion that extends into the first sub-pixel and is covered by a pixel electrode in the first sub-pixel and comprises a second portion that extends into the second sub-pixel and is covered by a pixel electrode in the second sub-pixel; wherein an orthographic projection of the first portion on the base is within the first overlap region of the first sub-pixel, and an orthographic projection of the second portion on the base is within the second overlap region of the second sub-pixel.

In some embodiments, each of the first portion and the second portion is an extension portion of at least one of a straight line, a curve, and a polyline.

In some embodiments, the data line includes a plurality of linear extension portions and a plurality of curved extension portions that are connected sequentially; wherein the curved extension portions are each provided an opening; the plurality of linear extension portions are all disposed between a first sub-pixel column and a second sub-pixel column, wherein the first sub-pixel column is a column of sub-pixels containing the first sub-pixel, and the second sub-pixel column is a column of sub-pixels containing the second sub-pixel; and the first portion includes at least one of the curved extension portions, the second portion includes at least one of the curved extension portions, and an opening direction of the curved extension portion in the first portion is opposite to an opening direction of the curved extension portion in the second portion.

In some embodiments, extension directions of the plurality of linear extension portions are all parallel to the second direction.

In some embodiments, the first portion includes a plurality of curved extension portions, wherein opening directions of the plurality of curved extension portions in the first portion are consistent; and the second portion includes a plurality of curved extension portions, wherein opening directions of the plurality of curved extension portions in the second portion are consistent.

In some embodiments, the data line includes a plurality of first linear extension portions and a plurality of second linear extension portions that are connected sequentially; wherein the plurality of first linear extension portions and the plurality of second linear extension portions are arranged staggeredly, and extension directions of any two connected the first linear extension portion and the second linear extension portion are intersected with each other; wherein for two adjacent the first linear extension portions in the same data line, an orthographic projection of one first linear extension portion on the base is overlapped with an orthographic projection of the pixel electrode in the first sub-pixel column on the base, and an orthographic projection of the other first linear extension portion on the base is overlapped with an orthographic projection of the pixel electrode in the second sub-pixel column on the base; an orthographic projection of the second linear extension portion in the data line on the base is overlapped with both the orthographic projection of the pixel electrode in the first sub-pixel column on the base and the orthographic projection of the pixel electrode in the second sub-pixel column on the base; and the first sub-pixel column is a column of sub-pixels containing the first sub-pixel, and the second sub-pixel column is a column of sub-pixels containing the second sub-pixel.

In some embodiments, extension directions of the plurality of first linear extension portions are all parallel to the second direction, and extension directions of the plurality of second linear extension portions are all parallel to the first direction.

In some embodiments, the one first linear extension portion is connected to a first electrode of a thin film transistor in the first sub-pixel column, and the orthographic projection of the one first linear extension portion on the base is overlapped with orthographic projections of two adjacent pixel electrodes in the first sub-pixel column on the base; and the orthographic projection of the other first linear extension portion on the base is within the orthographic projection of a pixel electrode in the second sub-pixel column on the base, and is spaced apart from an orthographic projection of the thin film transistor on the base.

In some embodiments, the pixel electrode in the sub-pixel covers the thin film transistor.

In some embodiments, the orthographic projection of the pixel electrode on the base is in a rectangular shape.

In some embodiments, distances between any two adjacent pixel electrodes are equal in the first direction; and distances between any two adjacent pixel electrodes are equal in the second direction.

In some embodiments, the first electrode includes a U-shaped structure, and the second electrode includes a strip-shaped structure, wherein at least a part of the strip-shaped structure is disposed in the U-shaped structure, and an end, distal from the U-shaped structure, of the strip-shaped structure is connected to the pixel electrode.

In some embodiments, the array substrate further includes a first auxiliary electrode connected to the second electrode, a second auxiliary electrode disposed at a side distal from the pixel electrode, of the first auxiliary electrode, and a first insulation layer disposed between the first auxiliary electrode and the second auxiliary electrode; wherein an orthographic projection of the first auxiliary electrode on the base is overlapped with an orthographic projection of the second auxiliary electrode on the base.

In some embodiments, the first auxiliary electrode is disposed in a same layer and is made of a same material as the first electrode and the second electrode; and the second auxiliary electrode is disposed in a same layer and is made of a same material as a gate electrode of the thin film transistor.

In some embodiments, the second electrode further includes a blocky structure connected to an end, distal from the U-shaped structure, of the strip-shaped structure, wherein the blocky structure is electrically connected to the pixel electrode.

In some embodiments, the array substrate further includes a second insulation layer disposed between the pixel electrode and the thin film transistor, wherein the second insulation layer has a via hole, and the pixel electrode is electrically connected to the blocky structure in the second electrode through the via hole.

According to another aspect of the embodiments of the present disclosure, a reflective display panel is provided. The reflective display panel includes an array substrate and a color film substrate that are oppositely disposed, and a liquid crystal layer disposed between the array substrate and the color film substrate. The array substrate includes: a basc, and a plurality of data lines and a plurality of sub-pixels that are disposed on the base; wherein the sub-pixel includes a reflective pixel electrode and a thin film transistor, wherein a first electrode of the thin film transistor is connected to a first data line, and a second electrode of the thin film transistor is connected to the pixel electrode; in the sub-pixel, a first overlap region is defined between an orthographic projection of the pixel electrode on the base and orthographic projections of the first electrode and the first data line on the base, and a second overlap region is defined between the orthographic projection of the pixel electrode on the base and an orthographic projection of a second data line on the base; and the first data line is one of the plurality of data lines, and the second data line is one of the plurality of data lines and is adjacent to the first data line.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
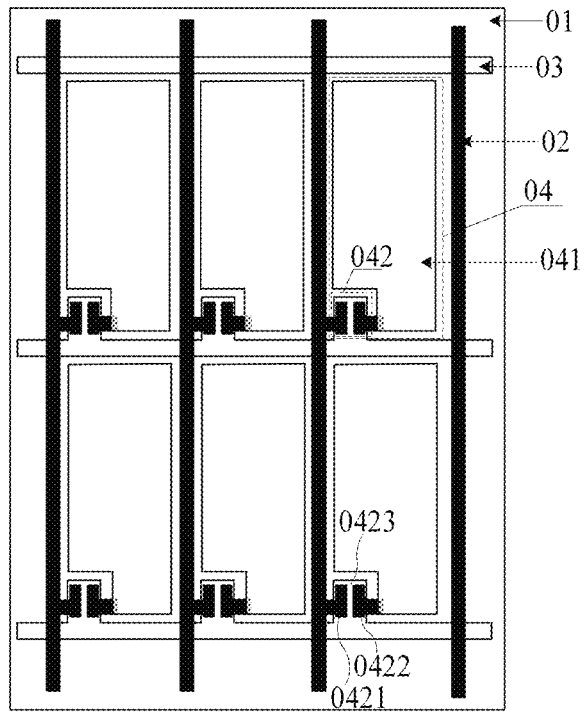
FIG. 1 is a top view of an ordinary array substrate at present.

Referring to FIG. 1, which is a top view of an ordinary array substrate at present, the array substrate may include a base 01, and a plurality of data lines 02, a plurality of gate lines 03 and a plurality of sub-pixels 04 that are disposed on the base 01. Each sub-pixel 04 may include a pixel electrode 041 and a thin-film transistor (TFT) 042. The TFT 042 may include a first electrode 0421, a second electrode 0422 and a gate electrode 0423. The first electrode 0421 of the TFT 042 may be connected to a data line 02, the second electrode 0422 of the TFT 042 may be connected to the pixel electrode 041, and the gate electrode 0423 of the TFT 042 may be connected to a gate line 03. In response to disposing the array substrate in a reflective display panel, the pixel electrode 041 in the array substrate needs to be prepared by a light-reflective metal material.

A display effect of the reflective display panel is positively related to an area of orthographic projections of a plurality of pixel electrodes 041 in the array substrate on the base 01. Thus, to improve the display effect of the reflective display panel at present, it is required to increase the area of orthographic projections of a plurality of pixel electrodes 041 in the array substrate on the base 01. However, after the area of orthographic projections of pixel electrodes 041 on the base 01 is increased, the orthographic projection of the pixel electrode 041 on the base 01 may be overlapped with an orthographic projection of the data line 02 on the base 01. In this way, a parasitic capacitor may be formed in an overlap portion of the pixel electrode 041 and the data line 02, resulting in an undesirable phenomenon of crosstalk of the array substrate. Thus, the display effect of the reflective display panel where the array substrate is disposed may be severely affected.

Figure 2:
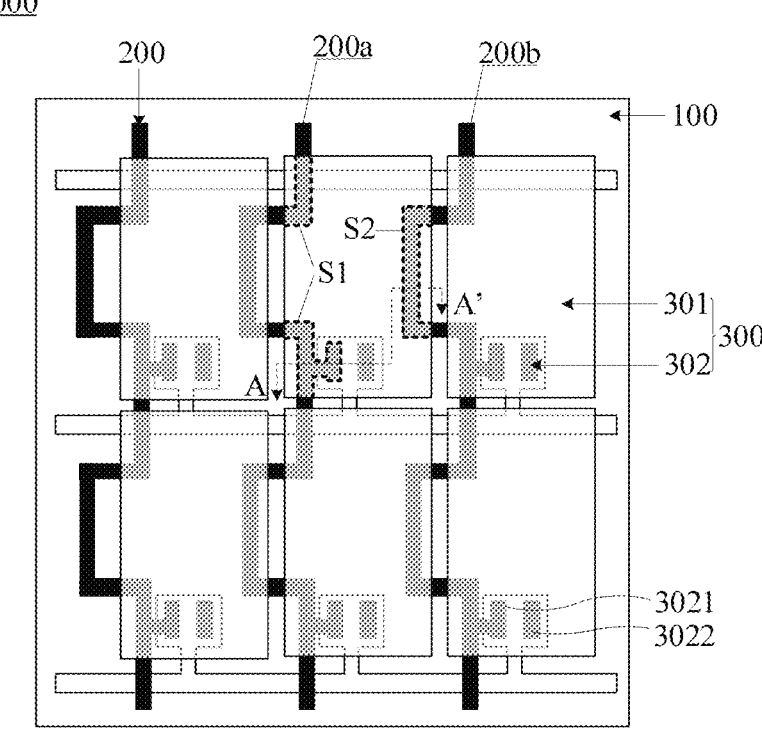
FIG. 2 is a top view of an array substrate according to an embodiment of the present disclosure.

Referring to FIG. 2, which is a top view of an array substrate according to an embodiment of the present disclosure, the array substrate 000 may include a base 100, and a plurality of data lines 200 and a plurality of sub-pixels 300 that are disposed on the base 100.

Each sub-pixel 300 may include a reflective pixel electrode 301 and a TFT 302. The TFT 302 has a first electrode 3021 and a second electrode 3022. It is to be noted that, in some embodiments of the present disclosure, the first electrode 3021 in the TFT 302 refers to one of a source electrode and a drain electrode in the TFT 302, and the second electrode 3022 in the TFT 302 refers to the other of the source electrode and the drain electrode in the TFT 302.

The first electrode 3021 of the TFT 302 in each sub-pixel 300 may be connected to a first data line 200$a$, and the second electrode 3022 of the TFT 302 in each sub-pixel 300 may be connected to the pixel electrode 301 in the sub-pixel 300.

In the present disclosure, the plurality of data lines 200 in the array substrate 000 include the first data line 200$a$ and a second data line 200$b$. The first data line 200$a$ is one of the plurality of data lines 200 and is connected to the first electrode 3021 of the TFT 302, and the second data line 200$b$ is one of the plurality of data lines 200 and is adjacent to the first data line 200$a$.

In each sub-pixel 300, there is a first overlap region S1 between an orthographic projection of the pixel electrode 301 on the base 100 and orthographic projections of the first electrode 3021 of the TFT 302 and the first data line 200$a$ on the base 100, and there is a second overlap region S2 between the orthographic projection of the pixel electrode 301 on the base 100 and an orthographic projection of the second data line 200$b$ on the base 100.

In some embodiments of the present disclosure, the pixel electrode 301 is insulated from the data line 200. Thus, a portion of each sub-pixel 300 disposed in the first overlap region S1 may form a first parasitic capacitor $Cdp_1$ (not shown in FIG. 2), and a portion of each sub-pixel 300 disposed in the second overlap region S2 may form a second parasitic capacitor $Cdp_2$ (not shown in FIG. 2).

Figure 3:
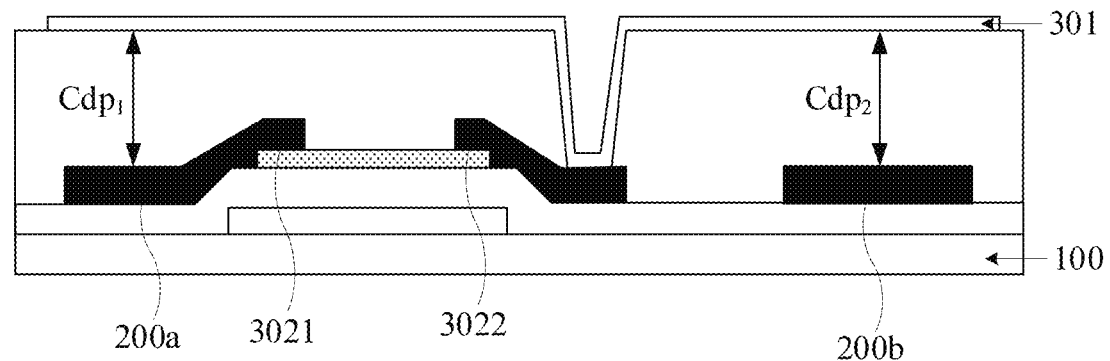
FIG. 3 is a schematic diagram illustrating a film layer of the array substrate shown in FIG. 2 at A-A'.

For clearer illustration of the structures of the parasitic capacitors in the sub-pixel 300, description is given by referring to made to FIG. 3, which is a schematic diagram illustrating a film layer of the array substrate shown in FIG. 2 at A-A'. To be detailed, a portion of the pixel electrode 301 disposed in the first overlap region S1 may serve as one electrode of the first parasitic capacitor $Cdp_1$, and a portion of the first electrode 3021 of the TFT 302 and the first data line 200$a$ disposed in the first overlap region S1 may serve as the other electrode of the first parasitic capacitor $Cdp_1$. A portion of the pixel electrode 301 disposed in the second overlap region S2 may serve as one electrode of the second parasitic capacitor $Cdp_2$, and a portion of a second data line 100$b$ disposed in the second overlap region S2 may serve as the other electrode of the second parasitic capacitor $Cdp_2$.

In some implementations, a capacitance of the first parasitic capacitor $Cdp_1$ in the sub-pixel 300 may be equal to a capacitance of the second parasitic capacitor $Cdp_2$ in the sub-pixel 300. In some other implementations, the capacitance of the first parasitic capacitor $Cdp_1$ in the sub-pixel 300 may also be not equal to the capacitance of the second parasitic capacitor $Cdp_2$ in the sub-pixel 300.

In some embodiments of the present disclosure, the orthographic projection of the pixel electrode 301 in each sub-pixel 300 on the base 100 is overlapped with orthographic projections of the first electrode 3021 of the TFT 302, the first data line 200$a$ and the second data line 200$b$ on the base 100. That is, both the first overlap region S1 and the second overlap region S2 are present in each sub-pixel 300. In this way, an area of orthographic projections of a plurality of pixel electrodes 301 in the array substrate 000 on the base 100 may be increased to achieve the better display effect of the reflective display panel where the array substrate 000 is disposed. Further, in the case that the reflective display panel displays in a column flip mode, voltages applied to the first data line 200$a$ and the second data line 200$b$ have opposite polarities. Therefore, under actions of the first parasitic capacitor $Cdp_1$ and the second parasitic capacitor $Cdp_2$, a pulling effect of positive and negative voltages applied to the pixel electrode 301 by the first data line 200$a$ and the second data line 200$b$ may be cancelled partially or totally, thereby reducing or eliminating impacts of the parasitic capacitors on the display of the reflective display panel.

In summary, the array substrate according to some embodiments of the present disclosure includes a base, and a plurality of data lines and a plurality of sub-pixels that are disposed on the base. Each sub-pixel may include a reflective pixel electrode and a TFT. The orthographic projection of the pixel electrode in each sub-pixel on the base is overlapped with the orthographic projections of the first electrode of the TFT, the first data line and the second data line, such that the area of the orthographic projections of a plurality of pixel electrodes in the array substrate on the base is larger, thereby achieving the better display effect of the reflective display panel where the array substrate is disposed. Further, in the case that the reflective display panel displays in the column flip mode, voltages applied to the first data line and the second data line have opposite polarities. In this way, under the actions of the first parasitic capacitor and the second parasitic capacitor, the pulling effect of positive and negative sub-pixel voltages applied to the pixel electrode by the first data line and the second data line can be cancelled partially or totally, thereby effectively reducing a probability that the parasitic capacitors affect the display of the reflective display panel. Therefore, in the precondition that the parasitic capacitors do not affect the display effect of the reflective display panel, the area of the orthographic projections of a plurality of pixel electrodes in the array substrate on the base may be increased to ensure the better display effect of the reflective display panel.

In the embodiments hereinafter, the capacitance of the first parasitic capacitor $Cdp_1$ and the capacitance of the second parasitic capacitor $Cdp_1$ in the sub-pixel 300 being same or substantially same (that is, the capacitances therebetween having a small difference) is described as an example.

In some embodiments of the present disclosure, as shown in FIG. 2 and FIG. 3, the first electrode 3021 and the second electrode 3022 of the TFT 302 in each sub-pixel 300 may be disposed in a same layer and be made of a same material as a plurality of data lines 200. In this way, the first electrode 3021 and the second electrode 3022 of the TFT 302 and the data lines 200 are formed by a one-time patterning process.

In this case, the distance between the pixel electrode 301 and the data line 200 is equal to the distance between the pixel electrode 301 and the first electrode 3021. The capacitances of the capacitors and an overlap area of two electrodes disposed oppositely in the capacitors are related to the distance between the two electrodes. Thus, when the first electrode 3021 and the second electrode 3022 of the TFT 302 are disposed in the same layer as a plurality of data lines 200, it is only required to ensure that the area of the first overlap region S1 on the base 100 is equal to the area of the second overlap region S2 on the base 100, so as to ensure that the capacitance of the first parasitic capacitor $Cdp_1$ in the sub-pixel 300 is equal to the capacitance of the second parasitic capacitor $Cdp_2$ in the sub-pixel 300.

Figure 4:
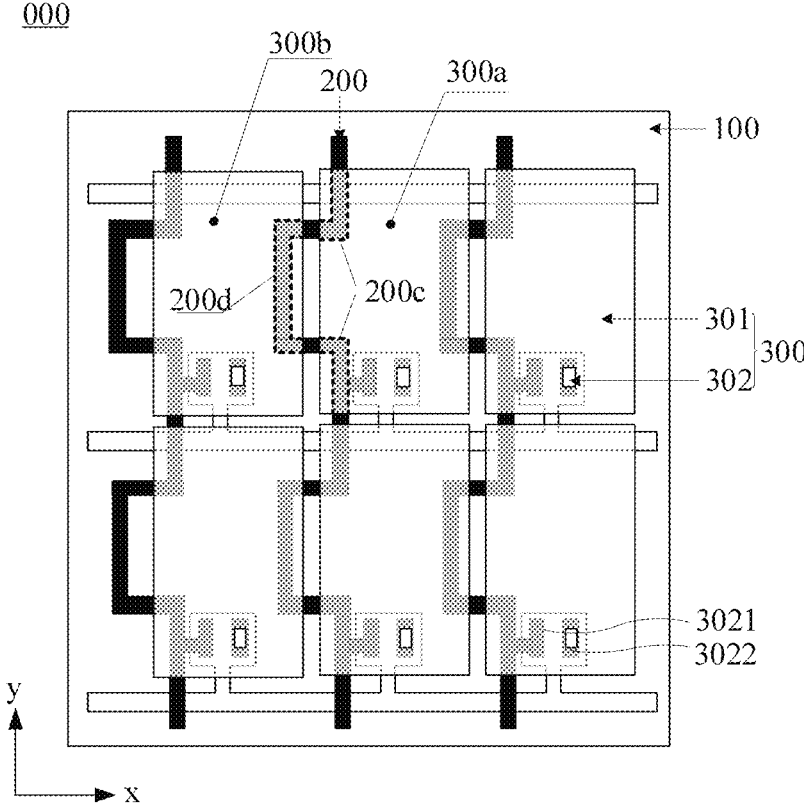
FIG. 4 is a top view of another array substrate according to an embodiment of the present disclosure.

In some embodiments of the present disclosure, referring to FIG. 4, which is a top view of another array substrate according to an embodiment of the present disclosure, a plurality of sub-pixels 300 in the array substrate 000 may be arranged in an array, i.e., the plurality of sub-pixels 300 in the array substrate 000 may be arranged in a plurality of columns along a first direction x, and may also be arranged in a plurality of rows along a second direction y. The first direction x is a row direction of a plurality of sub-pixels 300, the second direction y is a column direction of a plurality of sub-pixels 300, and the first direction x is perpendicular to the second direction y. Each data line 200 in the array substrate 000 generally extends along the second direction y on the base 100.

A plurality of sub-pixels 300 include a first sub-pixel 300a and a second sub-pixel 300b that are in the same row of sub-pixels 300 and disposed at both sides of the data line 200. The first sub-pixel 300a and the second sub-pixel 300b may be any two adjacent sub-pixels in any row. It is assumed that a column of sub-pixels containing the first sub-pixel 300a is a first sub-pixel column and a column of sub-pixels containing the second sub-pixel 300b is a second sub-pixel column. Then, the data line 200 between the first sub-pixel column and the second sub-pixel column has a first portion 200c that extends into the first sub-pixel 300a and is covered by a pixel electrode 301 in the first sub-pixel 300a and a second portion 200d that extends into the second sub-pixel 300b and is covered by a pixel electrode 301 in the second sub-pixel 300b. An orthographic projection of the first portion 200c on the base 100 is disposed in the first overlap region S1 of the first sub-pixel 300a, and an orthographic projection of the second portion 200d on the base 100 is disposed in the second overlap region S2 of the second sub-pixel 300b.

It is to be noted that the first portion 200c in the data line 200 is connected to the first electrode 3021 of the TFT 302, but the second portion 200d in the data line 200 is not connected to the TFT 302. Further, the orthographic projection of the second portion 200d in the data line 200 on the base 100 completely is overlapped with the second overlap region S2.

In this case, an orthographic projection of each data line 200 on the base 100 is overlapped with orthographic projections of pixel electrodes 301 in two columns of sub-pixels adjacent to the data line 200 on the base 100. Correspondingly, the orthographic projection of the pixel electrode 301 in each column of sub-pixels 300 on the base 100 is overlapped with the orthographic projections of two data lines 200 adjacent to the column of sub-pixels on the base 100.

In the present disclosure, each of the first portion 200c and the second portion 200d in the data line 200 is an extension portion of at least one of a straight line, a curve and a polyline. That is, the first portion 200c in the data line 200 may be at least one of a portion extending along the straight line, a portion extending along the curve and a portion extending along the polyline, and the second portion 200d in the data line 200 may also be at least one of a portion extending along the straight line, a portion extending along the curve and a portion extending along the polyline. Thus, the first portion 200c and the second portion 200d in the data line 200 may have a plurality of structures. In some embodiments of the present disclosure, description is given hereinafter by reference to the following two optional examples.

Figure 5:
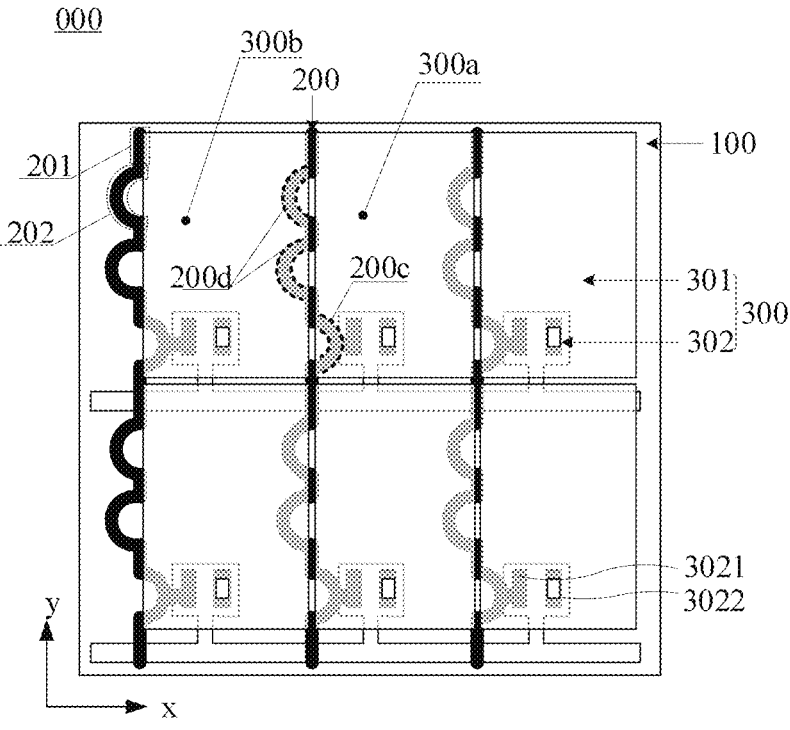
FIG. 5 is a top view of still another substrate according to an embodiment of the present disclosure.

In a first optional example, referring to made to FIG. 5, which is a top view of still another array substrate according to an embodiment of the present disclosure, each data line 200 in the array substrate 000 may include a plurality of linear extension portions 201 and a plurality of curved extension portions 202 that are connected sequentially. Each curved extension portion 202 has an opening, an extension direction of each curved extension portion 202 is a direction of the curve, and an extension direction of each linear extension portion 201 is parallel to the second direction y. The plurality of linear extension portions 201 and the plurality of curved extension portions 202 in the same data line 200 may be arranged staggeredly. It is to be noted that the plurality of curved extension portions 202 in the same data line 200 include two types of curved extension portions 202 having the same structure, only except for different opening directions.

The plurality of linear extension portions 201 in the same data line 200 may be all disposed between the first sub-pixel column and the second sub-pixel column.

The first portion 200c of the data line 200 may include at least one curved extension portion 202. The second portion 200d of the data line 200 may include at least one curved extension portion 202. Further, in the same data line 200, an opening direction of the curved extension portion 202 in the first portion 200c is opposite to an opening direction of the curved extension portion 202 in the second portion 200d. For example, the opening direction of the curved extension portion 202 in the first portion 200c is toward the second sub-pixel 300b, and the opening direction of the curved extension portion 202 in the second portion 200d is toward the first sub-pixel 300a.

It is to be noted that, in the case that the first portion 200c includes a plurality of curved extension portions 202, opening directions of the plurality of curved extension portions 202 are consistent. Similarly, in the case that the second portion 200d includes a plurality of curved extension portions 202, opening directions of the plurality of curved extension portions 202 are consistent.

In some embodiments of the present disclosure, the first portion 200c in the data line 200 needs to be connected to the first electrode 3021 of the TFT 302. Thus, to ensure that the capacitance of the first parasitic capacitor $Cdp_1$ is equal to the capacitance of the second parasitic capacitor $Cdp_2$ in any sub-pixel 300, the number of curved extension portions 202 in the first portion 200c needs to be less than the number of curved extension portions 202 in the second portion 200d.

The linear extension portion 201 disposed between the first sub-pixel 300a and the second sub-pixel 300b is arranged in the following two cases.

In a first case, an orthographic projection of the linear extension portion 201 on the base 100 is spaced apart from the orthographic projection of the pixel electrode 301 in the first sub-pixel 300*a* on the base 100, and is spaced apart from the orthographic projection of the pixel electrode 301 in the second sub-pixel 300*b* on the base 100. In this case, to ensure that the capacitance of the first parasitic capacitor Cdp₁ is equal to the capacitance of the second parasitic capacitor Cdp₂ in any sub-pixel 300, a distance between the linear extension portion 201 and the first sub-pixel 300*a* needs to be equal to a distance between the linear extension portion 201 and the second sub-pixel 300*b*.

In a second case, the orthographic projection of the linear extension portion 201 on the base 100 is overlapped with the orthographic projection of the pixel electrode 301 in the first sub-pixel 300*a* on the base 100, and is overlapped with the orthographic projection of the pixel electrode 301 in the second sub-pixel 300*b* on the base 100. In this case, to ensure that the capacitance of the first parasitic capacitor Cdp₁ is equal to the capacitance of the second parasitic capacitor Cdp₂ in any sub-pixel 300, an overlap area of the orthographic projection of the linear extension portion 201 and the orthographic projection of the pixel electrode 301 in the first sub-pixel 300*a* on the base 100 is equal to an overlap area of the orthographic projection of the linear extension portion 201 and the orthographic projection of the pixel electrode 301 in the second sub-pixel 300*b* on the base 100.

Figure 6:
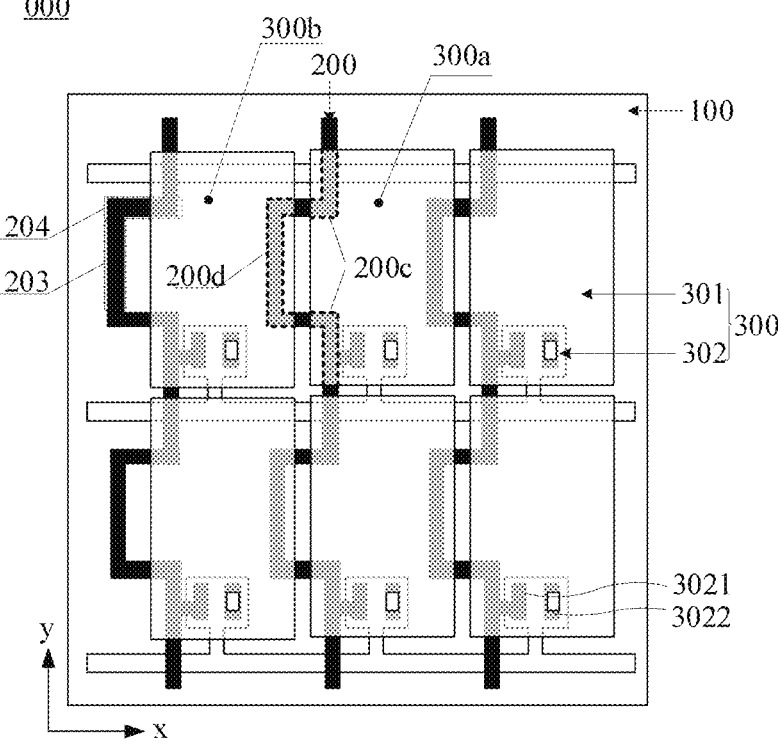
FIG. 6 is a top view of yet another substrate according to an embodiment of the present disclosure.

In a second optional example, referring to FIG. 6, which is a top view of yet another array substrate according to an embodiment of the present disclosure, each data line 200 in the array substrate 000 includes a plurality of first linear extension portions 203 and a plurality of second linear extension portions 204 that are sequentially connected with each other. Further, the plurality of first linear extension portions 203 and the plurality of second linear extension portions 204 may be arranged staggeredly, and extension directions of any two connected first linear extension portion 203 and second linear extension portion 204 are intersected with each other.

In an exemplary embodiment, extension directions of the plurality of first linear extension portions 203 in the same data line 200 are same, and all parallel to the second direction y; and extension directions of the plurality of second linear extension portions 204 in the same data line 200 are same, and all parallel to the first direction.

In the same data line 200, any two adjacent second linear extension portions 204 and the first linear extension portion 203 disposed between the two second linear extension portions 204 may form a bending structure with an opening. In this way, in the same data line 200, a plurality of second linear extension portions 204 and a plurality of first linear extension portions 203 may form a plurality of bending structures, and opening directions of any two adjacent bending structures are opposite.

In some embodiments of the present disclosure, for any two adjacent first linear extension portions 203 in the same data line 200, an orthographic projection of one first linear extension portion 203 on the base 100 is overlapped with the orthographic projection of the pixel electrode 301 in the first sub-pixel column on the base 100, and an orthographic projection of the other first linear extension portion 203 on the base 100 is overlapped with the orthographic projection of the pixel electrode 301 in the second sub-pixel column on the base 100. Further, an orthographic projection of each second linear extension portion 204 in the data line 200 on the base 100 is overlapped with both the orthographic projection of the pixel electrode 301 in the first sub-pixel column on the base 100 and the orthographic projection of the pixel electrode 301 in the second sub-pixel column on the base 100.

In an exemplary embodiment, for any two adjacent first linear extension portions 203 in the same data line 200, one first linear extension portion 203 may be connected to the first electrode 3021 of the TFT 302 in the first sub-pixel column, and the orthographic projection of the one first linear extension portion 203 on the base 100 is overlapped with orthographic projections of two adjacent pixel electrodes 301 in the first sub-pixel column on the base 100. The orthographic projection of the other first linear extension portion 203 on the base 100 is disposed in the orthographic projection of a pixel electrode 301 in the second sub-pixel column on the base 100, and is spaced apart from an orthographic projection of the TFT 302 on the base 100. In this way, the data line 200 is connected to the sub-pixel 300 in the first sub-pixel column through the first linear extension portion 203 in the data line 200, but the data line 200 is not connected to the sub-pixel 300 in the second sub-pixel column.

In this case, the first portion 200*c* of the data line 200 includes a part of two first linear extension portions 203 and a part of two second linear extension portions 204; and the second portion 200*d* of the data line 200 includes all of one first linear extension portion 203 and a part of two second linear extension portions 204.

Figure 7:
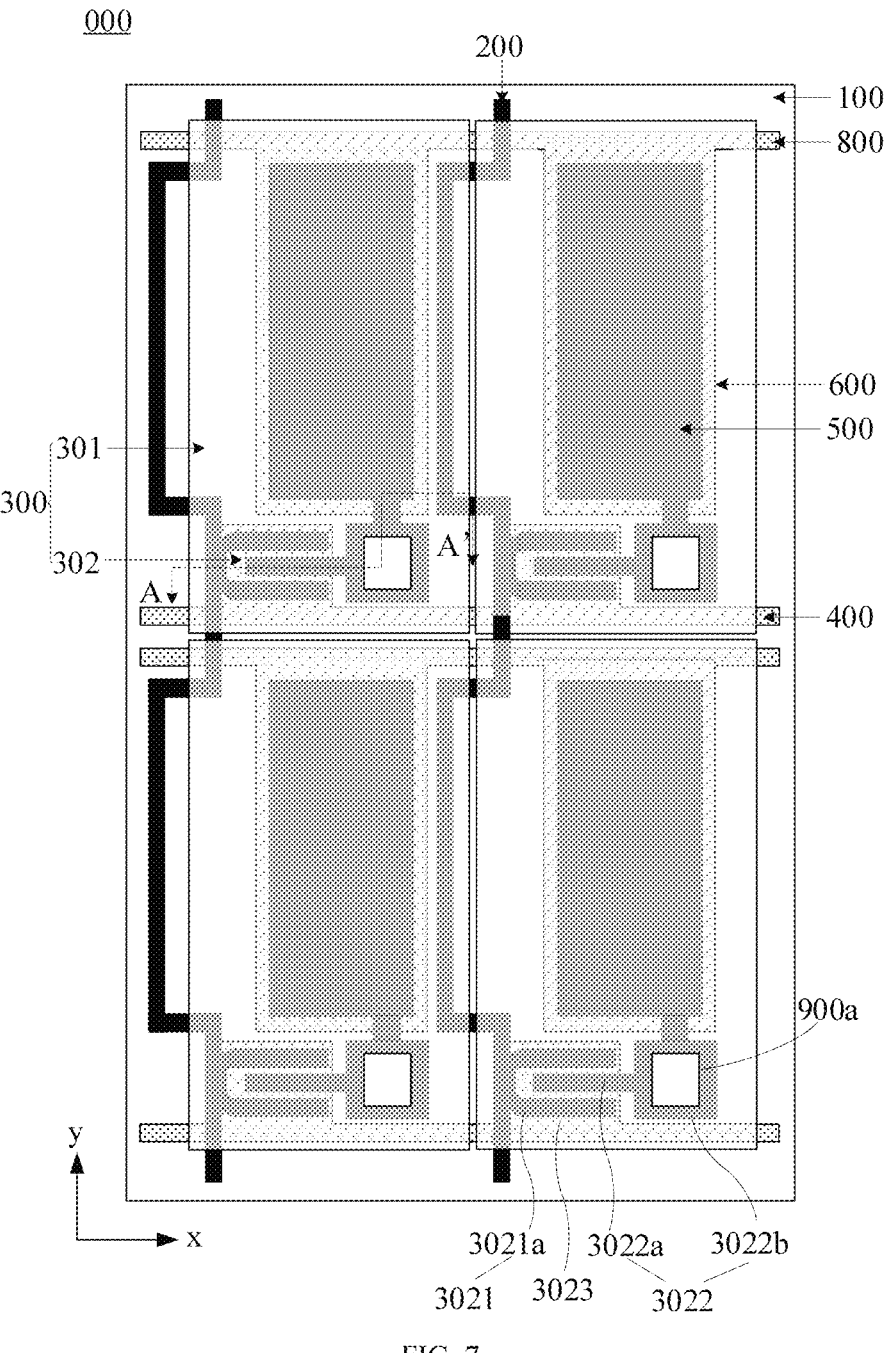
FIG. 7 is a top view of an array substrate according to another embodiment of the present disclosure.

In some embodiments, referring to FIG. 7, which is a top view of an array substrate according to another embodiment of the present disclosure, an orthographic projection of the TFT 302 in each sub-pixel 300 on the base 100 is disposed in the orthographic projection of the pixel electrode 301 in the sub-pixel 300 on the base 100. That is, the pixel electrode 301 in the sub-pixel 300 may cover the TFT 302 in this sub-pixel 300. Therefore, the area of orthographic projections of a plurality of pixel electrodes 301 in the array substrate 000 on the base 100 may be further increased. It is to be noted that the structure of the data line in the array substrate shown in FIG. 7 being the data line shown in FIG. 6 is illustratively described as an example.

In some embodiments of the present disclosure, the array substrate 000 may further include a plurality of gate lines 400 disposed on the base 100. The TFT 302 of each sub-pixel 300 in the array substrate 000 further includes a gate electrode 3023, and the gate electrode 3023 of the TFT 302 may be connected to a gate line 400. In an exemplary embodiment, the gate line 400 and the gate electrode 3023 may be disposed at a same layer and be made of a same material. In this way, the gate line 400 and the gate electrode 3023 may be formed by an one-time patterning process.

Figure 8:
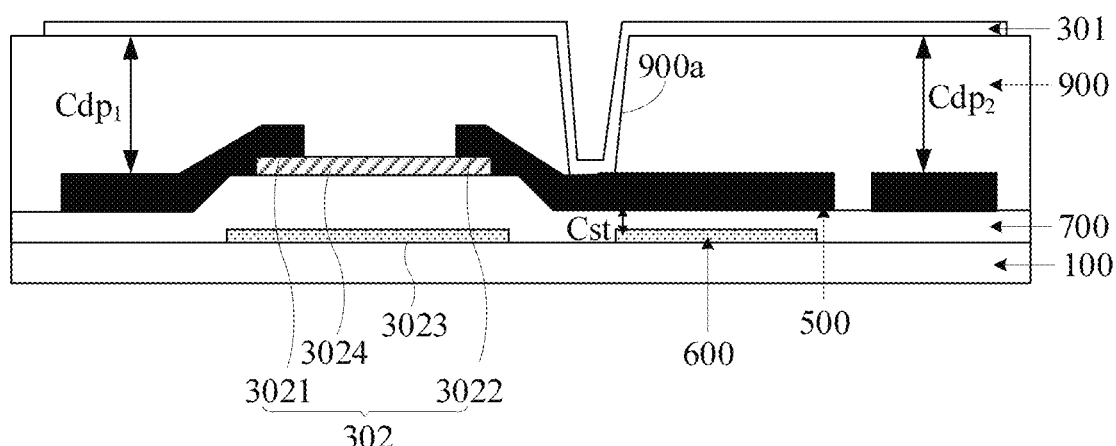
FIG. 8 is a structural schematic diagram illustrating a film layer of the array substrate shown in FIG. 7 at A-A'.

In some embodiments, referring to FIG. 8, which is a structural schematic diagram illustrating a film layer of the array substrate shown in FIG. 7 at A-A', the array substrate 000 may further include a first auxiliary electrode 500 connected to the second electrode 3022 of the TFT 302, a second auxiliary electrode 600 disposed at a side, distal from the pixel electrode 301, of the first auxiliary electrode 500, and a first insulation layer 700 disposed between the first auxiliary electrode 500 and the second auxiliary electrode 600.

In the present disclosure, an orthographic projection of the first auxiliary electrode 500 on the base 100 is overlapped with an orthographic projection of the second auxiliary electrode 600 on the base 100. The first auxiliary electrode 500 may be electrically connected to the pixel electrode 301 through the second electrode 3022. Thus, in the case of power-up, a potential of the first auxiliary electrode 500 is same as that of the pixel electrode 301. In this way, the first auxiliary electrode 500 and the second auxiliary electrode 600 may form a storage capacitor Cst, and the storage capacitor Cst may maintain the stability of voltages applied to the pixel electrode 301.

It is to be noted that there may be a plurality of first auxiliary electrodes 500 and a plurality of second auxiliary electrodes 600 in the array substrate 000, and the plurality of first auxiliary electrodes 500, the plurality of second auxiliary electrodes 600 and the plurality of pixel electrodes 301 are in one-to-one correspondence. The orthographic projection of each pixel electrode 301 on the base 100 is overlapped with both the orthographic projection of the corresponding first auxiliary electrode 500 on the base 100 and the orthographic projection of the corresponding second auxiliary electrode 600 on the base 100. The orthographic projections of the first auxiliary electrode 500 and the second auxiliary electrode 600 on the base 100 are both disposed in the orthographic projection of the corresponding pixel electrode 301 on the base 100.

In the present disclosure, the first auxiliary electrode 500 may be disposed in the same layer and be made of the same material as the first electrode 3021 and the second electrode 3022 of the TFT 302. That is, the first auxiliary electrode 500 and the first electrode 3021 and the second electrode 3022 of the TFT 302 are formed by a same one-time patterning process. The second auxiliary electrode 600 may be disposed at a same layer and be made of a same material as the gate electrode 3023 of the TFT 302. That is, the second auxiliary electrode 600 and the gate electrode 3023 are formed by a same one-time patterning process. In this way, a process of manufacturing the array substrate is effectively simplified.

In some embodiments, the array substrate 000 may further include a common electrode line 800 electrically connected to each row of second auxiliary electrodes 600, and the common electrode line 800 and the second auxiliary electrodes 600 may be disposed at a same layer and be made of a same material. That is, the common electrode line 800 and the second auxiliary electrode 600 may be formed by a same one-time patterning process. The common electrode line 800 may be electrically connected to a common electrode in a liquid display panel where the array substrate 000 is disposed. Thus, in the case of power-up, a potential of the second auxiliary electrode 600 is same as that of the common electrode.

In some embodiments of the present disclosure, in each sub-pixel 300, the first electrode 3021 of the TFT 302 includes a U-shaped structure 3021a, and the second electrode 3022 of the TFT 302 includes a strip-shaped structure 3022a; and at least a part of the strip-shaped structure 3022a of the second electrode 3022 is disposed in the U-shaped structure 3021a, and an end, distal from the U-shaped structure 3021a, of the strip-shaped structure 3022a is electrically connected to the pixel electrode 301.

In an exemplary embodiment, the second electrode 3022 of the TFT 302 in each sub-pixel 300 may further include a blocky structure 3022b. The blocky structure 3022b may be connected to an end, distal from the U-shaped structure, of the strip-shaped structure 3022a, and may be electrically connected to the pixel electrode 301. In this way, the second electrode 3022 of the TFT 302 may be electrically connected to the pixel electrode 301 through the blocky structure 3022b.

In the present disclosure, the TFT 302 in each sub-pixel 300 may further include an active layer 3024. The active layer 3024 is connected to both the first electrode 3021 and the second electrode 3022, and is insulated from the gate electrode 3023. For example, a first insulation layer 700 is disposed between the active layer 3024 and the gate electrode 3023. In the case that the first electrode 3021 in the TFT 302 includes the U-shaped structure 3021a and the second electrode 3022 in the TFT 302 includes the strip-shaped structure 3022a with at least a part thereof disposed in the U-shaped structure 3021a, a channel region of the active layer 3024 is a U-shaped channel region. It is to be noted that the channel region of the active layer 3024 refers to a region disposed between a first region and a second region, wherein the first region refers to a region that is in the active layer 3024 and is in contact with the first electrode 3021, and the second region refers to a region that is in the active layer 3024 and is in contact with the second electrode 3022. In the case that the channel region of the active layer 3024 is the U-shaped channel region, the TFT 302 may bear a high breakdown voltage since the U-shaped channel region has a large aspect ratio, thereby increasing the service life of the array substrate 000.

It is to be noted that, referring to FIG. 8, the array substrate further includes a second insulation layer 900 disposed between the pixel electrode 301 and the TFT 302. The second insulation layer 900 has a via hole 900a, and the pixel electrode 301 may be electrically connected to the blocky structure 3022b in the second electrode 3022 through the via hole 900a.

In some embodiments of the present disclosure, referring to in FIG. 7, an orthographic projection of a gate line 400 on the base 100 is overlapped with orthographic projections of the pixel electrodes 301 in a row of sub-pixels 300 on the base 100. Therefore, the area of orthographic projections of a plurality of pixel electrodes 301 in the array substrate 000 on the base 100 may be further increased.

In this case, the area of orthographic projections of a plurality of pixel electrodes 301 in the array substrate 000 on the base 100 is only related to a process precision for manufacturing the array substrate 000. In this way, distances between any two adjacent pixel electrodes 301 theoretically may be reduced infinitely, such that a ratio of the area of orthographic projections of a plurality of pixel electrodes 301 on the base 100 to a side, proximal to the pixel electrode 301, of the base 100 theoretically may be close to 100%. Therefore, the area of orthographic projections of a plurality of pixel electrodes 301 on the base 100 is large, thereby greatly improving the display effect of the reflective display panel. In an exemplary embodiment, various pixel electrodes 301 in a plurality of sub-pixels 300 are distributed in an array, and orthographic projections of the various pixel electrodes 301 on the base 100 are all in a rectangular shape. In this way, the distances between any two adjacent pixel electrodes 301 may be equal in the first direction x; and the distances between any two adjacent pixel electrodes 301 may be equal in the second direction y.

It is to be noted that an orthographic projection of the gate line 400 connected to the gate electrode 3023 of the TFT 302 in an $n^{th}$ row of sub-pixels on the base 100 being overlapped with an orthographic projection of the pixel electrode 301 in the $n^{th}$ row of sub-pixels on the base 100 is illustratively described as an example in FIG. 7. However, in this case, a parasitic capacitor may be formed between the pixel electrode 301 and the gate line 400. Due to the action of the parasitic capacitor, the reflective display panel where the array substrate 000 is disposed may flicker, thereby severely affecting the display effect of the reflective display panel.

Figure 9:
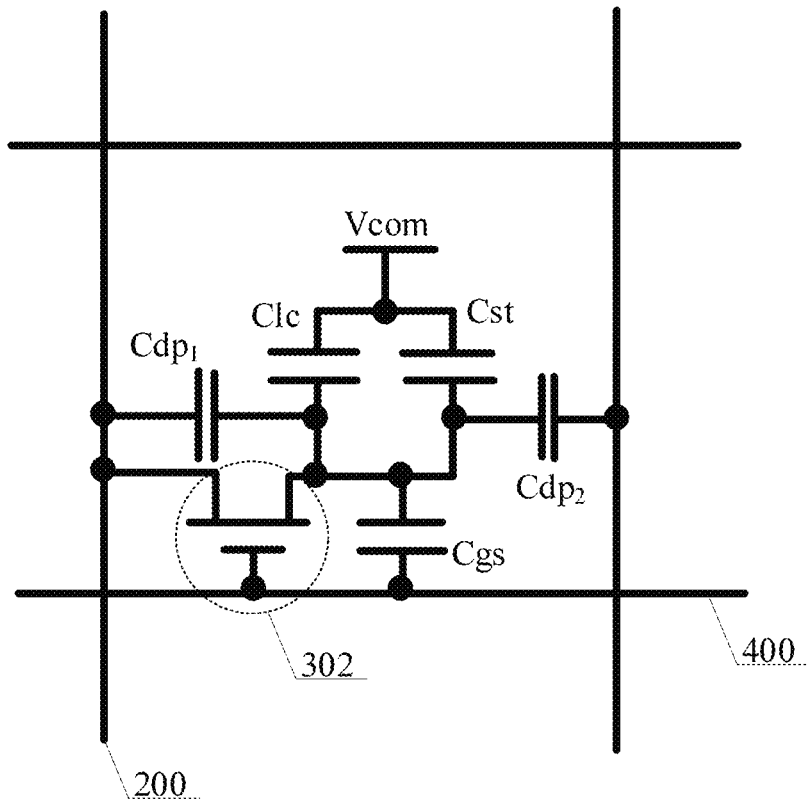
FIG. 9 is an equivalent circuit diagram of a sub-pixel in a reflective display panel.

In some embodiments, referring to FIG. 9, which is an equivalent circuit diagram of a sub-pixel in a reflective display panel, in each sub-pixel 300, the first electrode of the TFT 302 is connected to a data line 200, the second electrode of the TFT 302 is connected to the pixel electrode, and the gate electrode of the TFT 302 is connected to a gate line 400. The pixel electrode and a common electrode Vcom in the reflective display panel may form a liquid crystal capacitor Clc, and the pixel electrode and a common electrode line may form a storage capacitor Cst. The TFT 302 may output a data signal from the data line 200 to the pixel electrode in response to a gate driving signal provided by the gate line 400, so as to charge the pixel electrode and further form a potential difference between the pixel electrode and the common electrode Vcom. Under the action of the potential difference, liquid crystal molecules disposed between the pixel electrode and the common electrode Vcom may be deflected to control the sub-pixel to emit light.

Referring to FIG. 9, in each sub-pixel 300, the pixel electrode may form a first parasitic capacitor $Cdp_1$ together with the first data line and the first electrode which are connected with each other, and the pixel electrode and the second data line may form a second parasitic capacitor $Cdp_2$. In the case that a capacitance of the first parasitic capacitor $Cdp_1$ is equal to a capacitance of the second parasitic capacitor $Cdp_2$, the first parasitic capacitor $Cdp_1$ and the second parasitic capacitor $Cdp_2$ do not affect the display of the reflective display panel.

Referring to FIG. 9, in each sub-pixel 300, in the case that the orthographic projection of the pixel electrode in the sub-pixel on the base 100 is overlapped with the orthographic projection of the gate electrode connected to the sub-pixel on the base 100, the pixel electrode and the gate line may form a parasitic capacitor Cgs. In the case that a potential on the gate line 400 is changed, the gate line 400 may pull a potential of the pixel electrode due to a coupling effect of the parasitic capacitor Cgs, such that the potential of the pixel electrode deviates from a set potential. Since the potential of the pixel electrode is changed, but a potential of the common electrode Vcom generally is a constant value, a potential difference between the pixel electrode and the common electrode may be changed to eventually result in abnormal deflection of the liquid crystal molecules, thereby causing the reflective display panel to flicker and the display effect to be poorer.

In a process of charging the pixel electrode, a potential charged into the pixel electrode may jump to a certain extent both at the beginning and at the end of the charge under the action of the parasitic capacitor Cgs, and the actual potential eventually charged into the pixel electrode may deviate from the set potential. A potential difference $\Delta Vp$ between the actual potential and the set potential may satisfy the following formula.

$$\Delta V_p = \frac{Cgs}{Cgs + Clc + Cs}(VGH - CGL);$$

In the above formula, VGH represents a high voltage of the gate electrode, and CGL represents a low voltage of the gate electrode. It may be seen from the formula that the larger parasitic capacitor Cgs results in the larger $\Delta Vp$. However, $\Delta Vp$ represents a critical factor that affects image quality, and an excessive $\Delta Vp$ may increase risks such as image flickering and image residue caused by a brightness difference between positive and negative frames.

Figure 10:
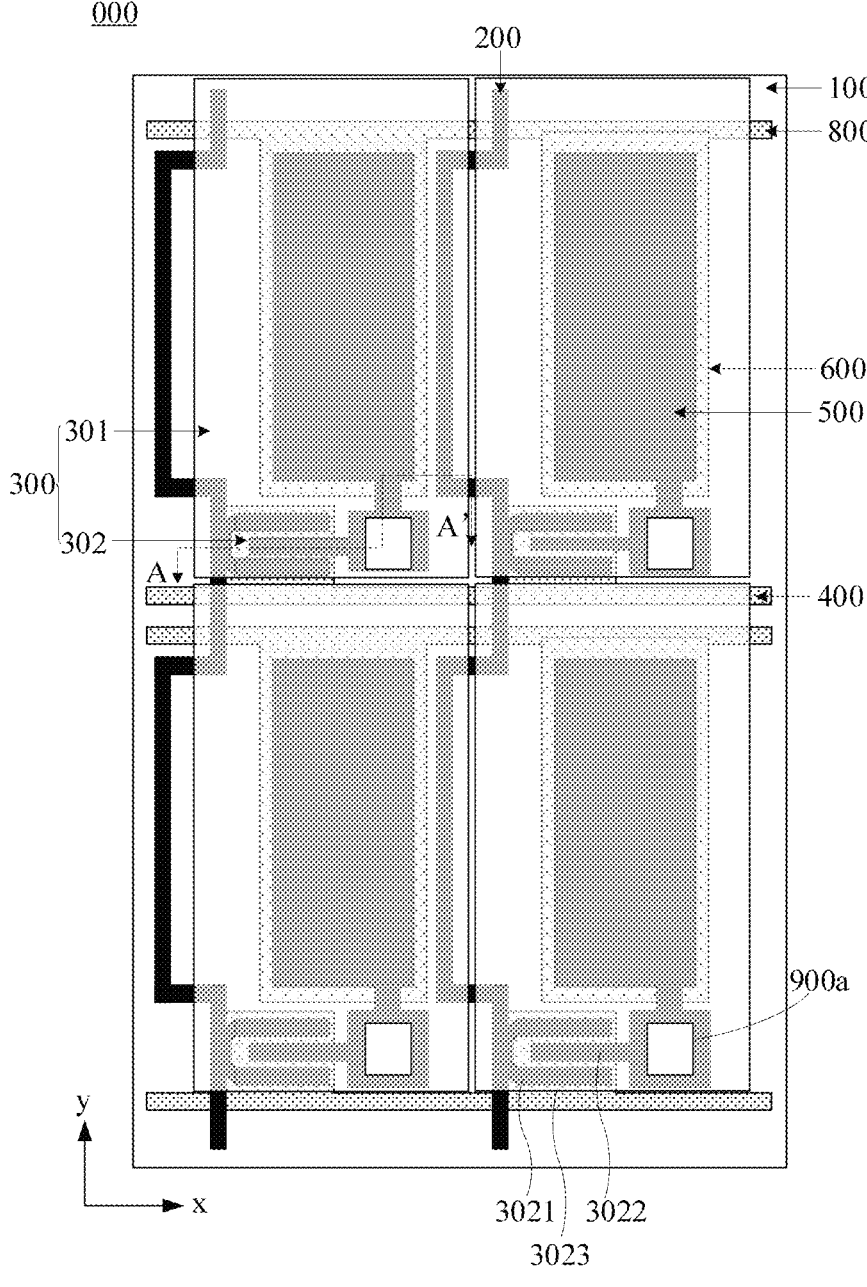
FIG. 10 is a top view of another array substrate according to another embodiment of the present disclosure.

For this purpose, referring to FIG. 10, which is a top view of another array substrate according to another embodiment of the present disclosure, the orthographic projection of the gate line 400 connected to the gate electrode 3023 of the TFT 302 in the n$^{th}$ row of sub-pixels on the base 100 may be spaced apart from the orthographic projection of the pixel electrode 301 in the n$^{th}$ row of sub-pixels on the base 100, and is overlapped with an orthographic projection of the pixel electrode 301 in an (n+1)$^{th}$ row of sub-pixels on the base 100. In this way, the gate line 400 connected to the gate electrode 3023 of the TFT 302 in the n$^{th}$ row of sub-pixels may form a parasitic capacitor together with the pixel electrode 301 in the (n+1)$^{th}$ row of sub-pixels rather than form the parasitic capacitor together with the pixel electrode 301 in the n$^{th}$ row of sub-pixels. Further, during display, it is required to charge the n$^{th}$ row of sub-pixels and the (n+1)$^{th}$ row of sub-pixels sequentially. Therefore, the parasitic capacitor formed between the gate line 400 connected to the gate electrode 3023 of the TFT 302 in the n$^{th}$ row of sub-pixels and the pixel electrode in the (n+1)$^{th}$ row of sub-pixels does not affect the (n+1)$^{th}$ row of sub-pixels being charged, thereby effectively reducing a probability of flickering of the reflective display panel where the array substrate 000 is disposed during image display, and further improving the display effect of the reflective display panel.

In some embodiments, any two adjacent data lines 200 in the array substrate 000 are configured to apply voltages with opposite polarities. In this way, the reflective display panel where the array substrate 000 is disposed displays in a column flip mode, thereby effectively avoiding aging of liquid crystal molecules in the reflective display panel. In other optional implementations, the reflective display panel may also display in a dot flip mode, which is not limited in embodiments of the present disclosure.

In some embodiments, the pixel electrode 301 in the above embodiments may be made of a light-reflective metal material. For example, the pixel electrode 301 may be made of a metal material such as metal aluminum, metal silver or alloy.

In summary, the array substrate according to an embodiment of the present disclosure includes a base, and a plurality of data lines and a plurality of sub-pixels that are disposed on the base. Each sub-pixel may include a reflective pixel electrode and a TFT. The orthographic projection of the pixel electrode in each sub-pixel on the base is overlapped with the orthographic projections of the first electrode of the TFT, the first data line and the second data line, such that the area of the orthographic projections of a plurality of pixel electrodes in the array substrate on the base is larger, thereby achieving the better display effect of the reflective display panel where the array substrate is disposed. Further, in the case that the reflective display panel displays in the column flip mode, voltages applied to the first data line and the second data line have opposite polarities. In this way, in the case that the capacitance of the first parasitic capacitor is equal to the capacitance of the second parasitic capacitor in each sub-pixel, under the actions of the first parasitic capacitor and the second parasitic capacitor, the pulling effect of positive and negative sub-pixel voltages applied to the pixel electrode by the first data line and the second data line can be cancelled, and the parasitic capacitors do not affect the display of the reflective display panel. Therefore, on the precondition that the parasitic capacitors do not affect the display effect of the reflective display panel, the area of orthographic projections of a plurality of pixel electrodes in the array substrate on the base may be increased to ensure the better display effect of the reflective display panel.

Figure 11:
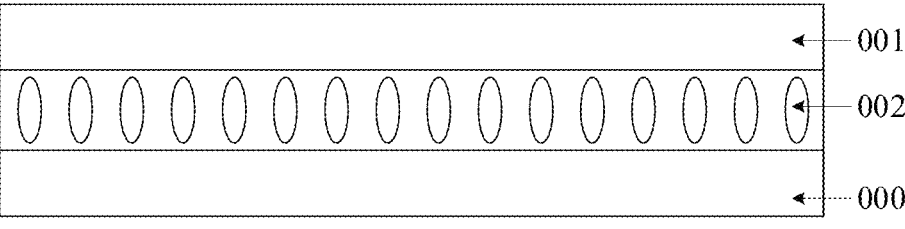
FIG. 11 is a structural schematic diagram illustrating a film layer of a reflective display panel according to an embodiment of the present disclosure.

In some embodiments of the present disclosure, a reflective display panel is further provided. Referring to FIG. 11, which is a structural schematic diagram illustrating a film layer of a reflective display panel according to an embodiment of the present disclosure, the reflective display panel may include:

an array substrate 000 and a color film substrate 001 that are oppositely disposed, and a liquid crystal layer 002 disposed between the array substrate 000 and the color film substrate 001. The array substrate 000 may be the array substrate in the above embodiment. For example, the array substrate 000 may be the array substrate shown in FIG. 2, FIG. 4, FIG. 5, FIG. 6, FIG. 7 or FIG. 10.

In the present disclosure, in the case that a common electrode is disposed on the color film substrate 002, the reflective display panel is a twisted nematic (TN) display panel.

In some embodiments of the present disclosure, a display apparatus is further provided, including the above reflective display panel. In some embodiments, the display apparatus may be any product or component having a display function, such as electronic paper, a mobile phone, a tablet computer, a television, a display, a notebook computer or a navigator.

It is to be noted that, in the accompanying drawings, dimensions of layers and regions may be scaled up for clarity of illustration. Moreover, it may be understood that when an element or layer is referred to as being "on" another element or layer, the element or layer may be directly on the other element, or there may be an intermediate layer. In addition, it may be understood that when an element or layer is referred to as being "under" another element or layer, the element or layer may be directly under the other element, or there may be more than one intermediate layer or element. In addition, it may be further understood that when a layer or element is referred to as being "between" two layers or two elements, the layer or element may be a unique layer between the two layers or two elements, or there may be more than one intermediate layer or element. Similar reference signs indicate similar elements throughout the whole specification.

In the present disclosure, terms "first" and "second" are only for the purpose of description and should not be construed as indicating or implying relative importance. The term "a plurality of" refers to two or more, unless otherwise explicitly defined.

Described above are merely optional embodiments of the present disclosure, but are not intended to limit the present disclosure. Any modifications, equivalent replacements, improvements and the like made within the spirit and principles of the present disclosure should be included within the scope of protection of the present disclosure.

The invention claimed is:

1. An array substrate, comprising a base, and a plurality of sub-pixels and a plurality of data lines that are disposed on the base, the plurality of sub-pixels arranged in an array, and the plurality of data lines are arranged along a row direction; wherein the sub-pixel comprises a reflective pixel electrode and a thin film transistor, wherein an orthographic projection of the reflective pixel electrode on the base is overlapped with both an orthographic projection of the thin film transistor on the base and an orthographic projection of two adjacent data lines of the plurality of data lines on the base, a first electrode of the thin film transistor is connected to one data line of the two adjacent data lines, and a second electrode of the thin film transistor is connected to the reflective pixel electrode;

the data line comprises a plurality of first linear extension portions and a plurality of second linear extension portions alternately arranged and sequentially connected, and extension directions of any two connected the first linear extension portion and the second linear extension portion are intersected with each other; and in a same data line, the plurality of first linear extension portions are extended along a column direction, the plurality of second linear extension portions are extended along the row direction, and any two adjacent second linear extension portions and the first linear extension portion disposed between the two adjacent second linear extension portions form a bending structure with an opening, and opening directions of any two adjacent bending structures are opposite;

wherein a first electrode of a first thin film transistor is connected to a first linear extension portion of a first bending structure, and the first thin film transistor is disposed on a side away from the opening of the first bending structure, wherein the first thin film transistor is any one of a plurality of the thin film transistors, and the first bending structure is one of the bending structures in the data line connected to the first thin film transistor; and the array substrate further comprises a first auxiliary electrode connected to the second electrode, a second auxiliary electrode disposed at a side, distal from the reflective pixel electrode, of the first auxiliary electrode, and an insulation layer disposed between the first auxiliary electrode and the second auxiliary electrode;

wherein an orthographic projection of the first auxiliary electrode on the base is overlapped with an orthographic projection of the second auxiliary electrode on the base;

an orthographic projection, on the base, of the first auxiliary electrode and the second auxiliary electrode corresponding to a first pixel electrode does not overlap with an orthographic projection, on the base, of the bending structure in the data line connected to the first thin film transistor, wherein the first pixel electrode is the reflective pixel electrode to which the first thin film transistor is connected; and the orthographic projection, on the base, of the first auxiliary electrode and the second auxiliary electrode corresponding to the first pixel electrode is at least partially disposed in a direction of an opening of an orthographic projection, on the base, of a second bending structure, wherein the second bending structure is another bending structure which is adjacent to the first bending structure in the data line connected to the first thin film transistor.

2. The array substrate according to claim 1, wherein an orthographic projection of the first bending structure on the base is overlapped with an orthographic projection, on the base, of two adjacent reflective pixel electrodes arranged along the row direction.

3. The array substrate according to claim 2, wherein the opening of the first bending structure is away from the reflective pixel electrode to which the first thin film transistor is connected.

4. The array substrate according to claim 1, wherein an orthographic projection of the first bending structure on the base is overlapped with an orthographic projection, on the base, of two adjacent reflective pixel electrodes arranged along the column direction.

5. The array substrate according to claim 1, wherein an orthographic projection of a second bending structure on the base is overlapped with an orthographic projection, on the base, of two adjacent reflective pixel electrodes arranged along the row direction, wherein the second bending structure is another bending structure which is adjacent to the first bending structure in the data line connected to the first thin film transistor, and is adjacent to the first bending structure.

6. The array substrate according to claim 5, wherein the opening of the second bending structure faces the reflective pixel electrode to which the first thin film transistor is connected.

7. The array substrate according to claim 1, wherein an orthographic projection of the first auxiliary electrode on the base is overlapped with an orthographic projection of the reflective pixel electrode, an orthographic projection of the second auxiliary electrode on the base is overlapped with the orthographic projection of the reflective pixel electrode, and the orthographic projection of the first auxiliary electrode on the base and the orthographic projection of the second auxiliary electrode on the base are both disposed in the orthographic projection of the reflective pixel electrode.

8. An array substrate, comprising a base, and a plurality of sub-pixels and a plurality of data lines that are disposed on the base, the plurality of sub-pixels arranged in an array, and the plurality of data lines are arranged along a row direction; wherein the sub-pixel comprises a reflective pixel electrode and a thin film transistor, wherein an orthographic projection of the reflective pixel electrode on the base is over-lapped with both an orthographic projection of the thin film transistor on the base and an orthographic projection of two adjacent data lines of the plurality of data lines on the base, a first electrode of the thin film transistor is connected to one data line of the two adjacent data lines, and a second electrode of the thin film transistor is connected to the reflective pixel electrode;

the data line comprises a plurality of first linear extension portions and a plurality of second linear extension portions alternately arranged and sequentially connected, and extension directions of any two connected the first linear extension portion and the second linear extension portion are intersected with each other; and in a same data line, the plurality of first linear extension portions are extended along a column direction, the plurality of second linear extension portions are extended along the row direction, and any two adjacent second linear extension portions and the first linear extension portion disposed between the two adjacent second linear extension portions form a bending struc-ture with an opening, and opening directions of any two adjacent bending structures are opposite;

wherein a first electrode of a first thin film transistor is connected to a first linear extension portion of a first bending structure, and the first thin film transistor is disposed on a side away from the opening of the first bending structure, wherein the first thin film transis-tor is any one of a plurality of the thin film transis-tors, and the first bending structure is one of the bending structures in the data line connected to the first thin film transistor;

the array substrate further comprises a first auxiliary electrode connected to the second electrode, a sec-ond auxiliary electrode disposed at a side, distal from the reflective pixel electrode, of the first auxiliary electrode, and an insulation layer disposed between the first auxiliary electrode and the second auxiliary electrode; wherein an orthographic projection of the first auxiliary electrode on the base is overlapped with an orthographic projection of the second aux-iliary electrode on the base; and the array substrate further comprises a plurality of common electrode lines, each of the common elec-trode lines is electrically connected to each row of the second auxiliary electrodes; and an orthographic projection of the second linear extension portion on the base is spaced apart from an orthographic pro-jection of the common electrode line on the base.

9. An array substrate, comprising a base, and a plurality of sub-pixels and a plurality of data lines that are disposed on the base, the plurality of sub-pixels arranged in an array, and the plurality of data lines are arranged along a row direction; wherein the sub-pixel comprises a reflective pixel electrode and a thin film transistor, wherein an orthographic projection of the reflective pixel electrode on the base is over-lapped with both an orthographic projection of the thin film transistor on the base and an orthographic projec-tion of two adjacent data lines of the plurality of data lines on the base, a first electrode of the thin film transistor is connected to one data line of the two adjacent data lines, and a second electrode of the thin film transistor is connected to the reflective pixel elec-trode;

the data line comprises a plurality of first linear extension portions and a plurality of second linear extension portions alternately arranged and sequentially con-nected, and extension directions of any two connected the first linear extension portion and the second linear extension portion are intersected with each other; and in a same data line, the plurality of first linear extension portions are extended along a column direction, the plurality of second linear extension portions are extended along the row direction, and any two adjacent second linear extension portions and the first linear extension portion disposed between the two adjacent second linear extension portions form a bending struc-ture with an opening, and opening directions of any two adjacent bending structures are opposite;

wherein a first electrode of a first thin film transistor is connected to a first linear extension portion of a first bending structure, and the first thin film transistor is disposed on a side away from the opening of the first bending structure, wherein the first thin film transis-tor is any one of a plurality of the thin film transis-tors, and the first bending structure is one of the bending structures in the data line connected to the first thin film transistor; and the first electrode comprises a U-shaped structure, and the second electrode comprises a strip-shaped struc-ture; wherein at least a part of the strip-shaped structure is disposed in the U-shaped structure, and an end, distal from the U-shaped structure, of the strip-shaped structure is connected to the reflective pixel electrode.

10. The array substrate according to claim 9, wherein an opening direction of the U-shaped structure of the first thin film transistor is opposite to an opening direction of the first bending structure connected to the first thin film transistor.

11. The array substrate according to claim 9, wherein the second electrode further comprises a blocky structure con-nected to an end, distal from the U-shaped structure, of the strip-shaped structure; wherein the blocky structure is elec-trically connected to the reflective pixel electrode.

12. The array substrate according to claim 1, further comprising a plurality of gate lines, the plurality of data lines are arranged along the column direction, and each of the gate line is extended along the row direction, and a gate electrode of the thin film transistor is connected to the gate line; and an orthographic projection of the gate line on the base is overlapped with orthographic projections of the reflective pixel electrodes in a row of sub-pixels on the base.

13. The array substrate according to claim 12, wherein an orthographic projection, on the base, of the gate line connected to the gate electrode of the thin film transistor in the $n^{th}$ row of sub-pixels, is spaced apart from an orthographic projection, on the base, of the reflective pixel electrode in the $n^{th}$ row of sub-pixels, and is overlapped with an orthographic projection of the pixel electrode in the $(n+1)^{th}$ row of sub-pixels, wherein n≥1, and n is a positive integer.

14. The array substrate according to claim 1, wherein in the sub-pixel, a first overlap region is defined between the orthographic projection of the reflective pixel electrode on the base and orthographic projections of the first electrode of the thin film transistor and the one data line of the two adjacent data lines on the base, and a second overlap region is defined between the orthographic projection of the reflective pixel electrode on the base and an orthographic projection of the other data line of the two adjacent data lines on the base; and a portion that is in the sub-pixel and disposed in the first overlap region is configured to form a first parasitic capacitor, and a portion that is in the sub-pixel and disposed in the second overlap region is configured to form a second parasitic capacitor, wherein a capacitance of the first parasitic capacitor is equal to a capacitance of the second parasitic capacitor.

15. The array substrate according to claim 14, wherein the reflective pixel electrode in the sub-pixel covers the thin film transistor.

16. An array substrate, comprising a base, and a plurality of sub-pixels and a plurality of data lines that are disposed on the base, the plurality of sub-pixels arranged in an array, and the plurality of data lines are arranged along a row direction; wherein the sub-pixel comprises a reflective pixel electrode and a thin film transistor, wherein an orthographic projection of the reflective pixel electrode on the base is overlapped with both an orthographic projection of the thin film transistor on the base and an orthographic projection of two adjacent data lines of the plurality of data lines on the base, a first electrode of the thin film transistor is connected to one data line of the two adjacent data lines, and a second electrode of the thin film transistor is connected to the reflective pixel electrode;

the data line comprises a plurality of linear extension portions and a plurality of curved extension portions alternately arranged and sequentially connected, the curved extension portions are each provided an opening;

in a same data line, the plurality of linear extension portions are all extended along a column direction, and disposed between a first sub-pixel column and a second sub-pixel column, wherein the first sub-pixel column is a column of sub-pixels comprising a first sub-pixel, the second sub-pixel column is a column of sub-pixels comprising a second sub-pixel, and the first sub-pixel and the second sub-pixel are two sub-pixels of the plurality of sub-pixels that are in a same row of sub-pixels and disposed on both sides of the data line; and wherein a first electrode of the thin film transistor is connected to a curved extension portion, and the thin film transistor is disposed outside the opening of the curved extension portion connected to the thin film transistor.

17. The array substrate according to claim 16, wherein the plurality of curved extension portions comprise at least one first curved extension portion and at least one second curved extension portion;

the first curved extension portion is connected to the first electrode of the thin film transistor of the first sub-pixel, and an orthographic projection of the first curved extension portion on the base is overlapped with an orthographic projection of the reflective pixel electrode of the first sub-pixel on the base;

an orthographic projection of the second curved extension portion on the base is overlapped with an orthographic projection of the reflective pixel electrode of the second sub-pixel on the base; and wherein opening directions of the first curved extension portion and the second curved extension portion are consistent.

* * * * *